US010917327B1

(12) United States Patent
Oz et al.

(10) Patent No.: US 10,917,327 B1
(45) Date of Patent: Feb. 9, 2021

(54) ADAPTIVE TESTING BASED ON REAL-TIME ANALYSIS

(71) Applicant: EMC IP Holding Company LLC, Hopkinton, MA (US)

(72) Inventors: Danny Oz, Bat-Yam (IL); Ilan Yosef, Petach Tikva (IL); Itay Kaufman, Netanya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/832,714

(22) Filed: Mar. 27, 2020

(51) Int. Cl.
*H04L 29/06* (2006.01)
*H04L 12/26* (2006.01)
*H04L 12/24* (2006.01)
*G06F 9/50* (2006.01)
*G06F 1/32* (2019.01)
*G06F 15/173* (2006.01)
*G06F 1/26* (2006.01)

(52) U.S. Cl.
CPC .......... *H04L 43/50* (2013.01); *H04L 41/0816* (2013.01)

(58) Field of Classification Search
USPC ................................................ 709/221, 226
See application file for complete search history.

(56) References Cited

U.S. PATENT DOCUMENTS

| 8,285,999 | B1* | 10/2012 | Ghose | G06F 21/565 |
| | | | | 713/176 |
| 8,904,353 | B1* | 12/2014 | Arguelles | G06F 11/3664 |
| | | | | 717/124 |
| 2013/0117596 | A1* | 5/2013 | Furukawa | G06F 11/3409 |
| | | | | 713/340 |
| 2014/0095718 | A1* | 4/2014 | Daly | G06F 9/5033 |
| | | | | 709/226 |
| 2016/0054378 | A1* | 2/2016 | Walker | G11C 11/40626 |
| | | | | 324/750.03 |
| 2016/0179173 | A1* | 6/2016 | Eastep | G06F 1/3234 |
| | | | | 713/320 |
| 2017/0257388 | A1* | 9/2017 | Addepalli | H04L 63/1416 |
| 2020/0125411 | A1* | 4/2020 | Goodman | G06F 9/5016 |

* cited by examiner

*Primary Examiner* — Jude Jean Gilles
(74) *Attorney, Agent, or Firm* — Daly, Crowley Mofford & Durkee, LLP

(57) ABSTRACT

A method comprising: selecting a test for execution on a computing system; identifying a set of performance counters that is associated with the test; executing the test and the set of performance counters on the computing system, the test and the set of performance counters being executed concurrently with one another; generating an execution signature for the test based on the set of performance counters, the execution signature being generated while the test is being executed on the computing system; reconfiguring the test based on the execution signature, the test being reconfigured while the test is being executed on the computing system, wherein each of the performance counters in the set is associated with a different respective operational parameter of the computing system; wherein each of the performance counters in the set includes logic for collecting values of the performance counter's respective operational parameter.

20 Claims, 6 Drawing Sheets

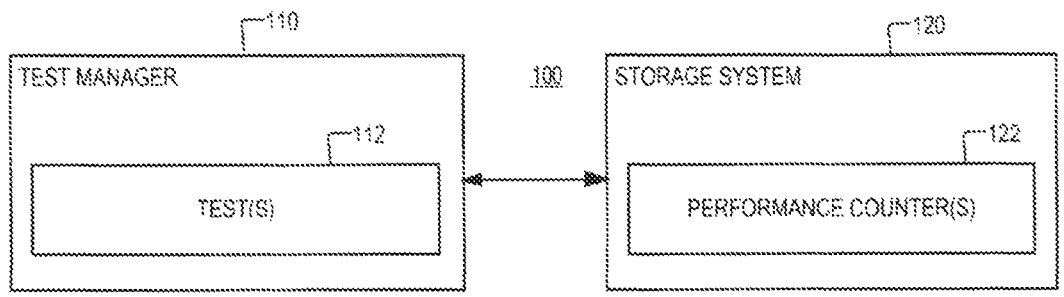
FIG. 1A
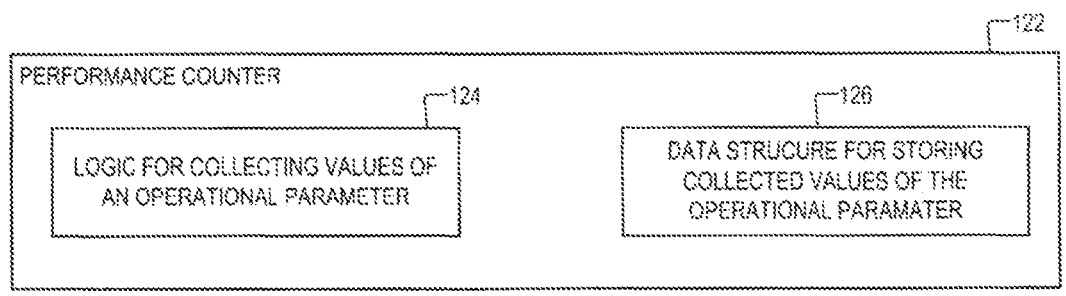
FIG. 1B
| METRIC VALUE | TIMESTAMP |
|---|---|
| VAL_1 | TS_1 |
| VAL_2 | TS_2 |
| ... | ... |
| VAL_5 | TS_N |
FIG. 1C

| | TEST ID | COUNTER SET | | RECONFIGURATION PERIOD | |
|---|---|---|---|---|---|
| 310A | TEST_1  312 | <COUNTER 1, COUNTER 3, COUNTER 5> | 314 | 1 MIN. | 316 |
| 310B | TEST_2  312 | <COUNTER 2, COUNTER 6, COUNTER 7> | 314 | 10 MIN. | 316 |
| 310C | TEST_3  312 | <COUNTER 1, COUNTER 4, COUNTER 6> | 314 | 20 SEC. | 316 |
| 310D | TEST_4  312 | <COUNTER 1, COUNTER 2, COUNTER 5> | 314 | 30 MIN. | 316 |

FIG. 3

| | TEST ID | SETTING MAP ID | |
|---|---|---|---|
| 410A | TEST_1  412 | SETTING_MAP_1 | 414 |
| 410B | TEST_2  412 | SETTING_MAP_2 | 414 |
| 410C | TEST_3  412 | SETTING_MAP_3 | 414 |
| 410D | TEST_4  412 | SETTING_MAP_4 | 414 |

FIG. 4

| | EXECUTION SIGNATURE | | CONFIGURATION SETTING VALUE | |
|---|---|---|---|---|
| 510-1 | EXECUTION_SIGNATURE_VALUE_1 | 512 | TCSV_1 | 514 |
| 510-2 | EXECUTION_SIGNATURE_VALUE_2 | 512 | TCSV_2 | 514 |
| | • • • • • | | | |
| 510-M | EXECUTION_SIGNATURE_VALUE_M | 512 | TCSV_M | 514 |

FIG. 5

ADAPTIVE TESTING BASED ON
REAL-TIME ANALYSIS

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

According to aspects of the disclosure, a method is provided comprising: selecting a test for execution on a computing system; identifying a set of performance counters that is associated with the test; executing the test and the set of performance counters on the computing system, the test and the set of performance counters being executed concurrently with one another; generating an execution signature for the test based on the set of performance counters, the execution signature being generated while the test is being executed on the computing system; reconfiguring the test based on the execution signature, the test being reconfigured while the test is being executed on the computing system, wherein each of the performance counters in the set is associated with a different respective operational parameter of the computing system; wherein each of the performance counters in the set includes logic for collecting values of the performance counter's respective operational parameter.

According to aspects of the disclosure, an apparatus is provided comprising: a memory; and at least one processor operatively coupled to the memory, the at least one processor being configured to perform the operations of: selecting a test for execution on a computing system; identifying a set of performance counters that is associated with the test; executing the test and the set of performance counters on the computing system, the test and the set of performance counters being executed concurrently with one another; generating an execution signature for the test based on the set of performance counters, the execution signature being generated while the test is being executed on the computing system; reconfiguring the test based on the execution signature, the test being reconfigured while the test is being executed on the computing system, wherein each of the performance counters in the set is associated with a different respective operational parameter of the computing system; wherein each of the performance counters in the set includes logic for collecting values of the performance counter's respective operational parameter.

According to aspects of the disclosure, a non-transitory computer-readable medium is provided that stores one or more processor-executable instructions, which, when executed by at least one processor cause the at least one processor to perform the operations of: selecting a test for execution on a computing system; identifying a set of performance counters that is associated with the test; executing the test and the set of performance counters on the computing system, the test and the set of performance counters being executed concurrently with one another; generating an execution signature for the test based on the set of performance counters, the execution signature being generated while the test is being executed on the computing system; reconfiguring the test based on the execution signature, the test being reconfigured while the test is being executed on the computing system, wherein each of the performance counters in the set is associated with a different respective operational parameter of the computing system; wherein each of the performance counters in the set includes logic for collecting values of the performance counter's respective operational parameter.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 1A is a diagram of an example of a system, according to aspects of the disclosure;

FIG. 1B is a diagram of an example of a performance counter, according to aspects of the disclosure;

FIG. 1C is a diagram of an example of a data structure, according to aspects of the disclosure;

FIG. 3 is a diagram of an example of a test-to-counter map, according to aspects of the disclosure;

FIG. 4 is a diagram of an example of a reconfiguration database, according to aspects of the disclosure;

FIG. 5 is a diagram of an example of a settings map, according to aspects of the disclosure;

DETAILED DESCRIPTION

Figure 2:
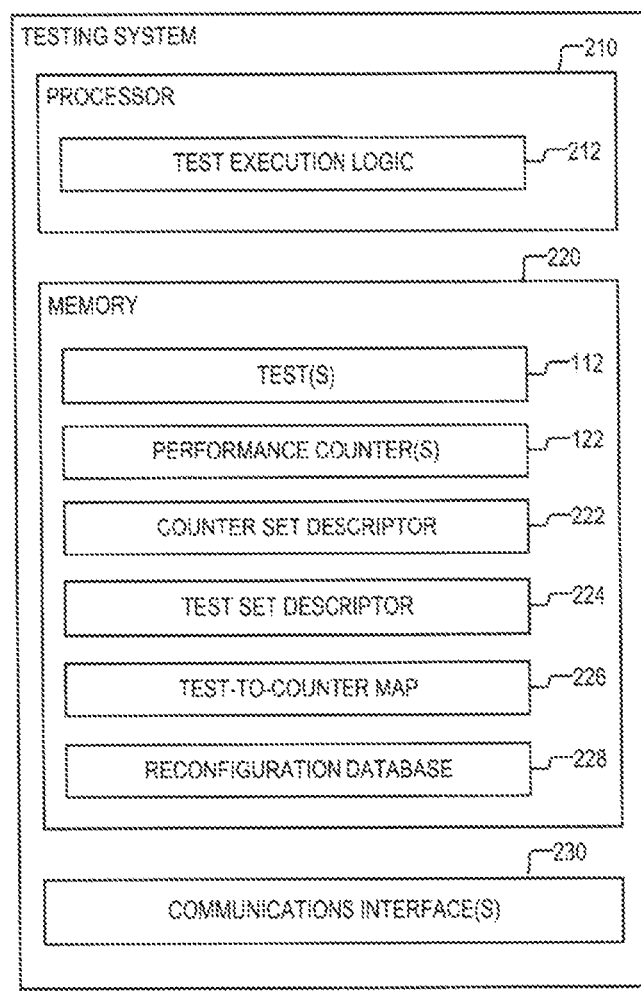
FIG. 2 is a diagram of an example of a testing system, according to aspects of the disclosure.

FIG. 1A is a diagram of an example of a testing system according to aspects of the disclosure. As illustrated, the testing system 100 may include a test manager 110 and a storage system 120. The test manager 110 may include any suitable type of computing device that is configured to execute one or more tests on the storage system 120. The storage system 120 may include any suitable type of storage system, such as a content-addressed storage system or a location addressed storage system, for example. According to the present example, the storage system 120 is a distributed storage system including a plurality of computing devices, such as the computing device 800, which is discussed further below with respect to FIG. 8. However, alternative implementations are possible in which the storage system 120 is an integrated storage system.

The test manager 110 may store in memory one or more tests 112 for testing the operation of the storage system 120. Each of the tests may include logic, which when executed by the test manager 110, causes the test manager 110 to execute one or more operations for testing whether the storage system 120 is operating correctly (e.g., in accordance with predetermined operational constraints). In some implementations, executing the one or more tests may include (i) transmitting a stream of work requests to the storage system 120, (ii) detecting various characteristics of the operation of the storage system 120 when the one or more work requests are executed, and (iii) determining whether the storage system is able to meet a predetermined operational constraint. Additionally or alternatively, in some implementations, executing the one or more tests may include (i) transmitting at least one work request to the storage system 120, (ii) detecting various characteristics of the operation of the storage system 120 when the at least one work request is executed, and (iii) determining whether the storage system is able to meet a predetermined operational constraint. According to the present disclosure, the phrase "transmitting a work request" may refer to issuing an instruction that causes (directly or indirectly) the storage system 120 to perform an action.

For example, executing a particular test 112 by the test manager 110 may include transmitting to the storage system 120 a series of read requests and measuring the latency at which each of the read requests is executed. As another example, executing another test 112 by the test manager 110 may include transmitting to the storage system 120 an instruction to begin performing synchronous replication using an algorithm that is currently in development, and measuring how much storage space is saved by the algorithm under development. In any event, it will be understood that the present disclosure is not limited to using any specific type of test.

The storage system 120 may be configured to execute one or more performance counters 122. Each of the performance counters 122 may be configured to record the values of a different operational parameter of the storage system 120 while any of the tests 112 is being executed. As illustrated in FIG. 1B, a performance counter 122 may include at least one of (i) a logic 124 for collecting the values of a particular operational parameter and/or (ii) a data structure 126 for storing the collected values of the operational parameter. FIG. 1C shows a schematic diagram of the data structure 126 in further detail. As illustrated, the data structure 126 may include a table having entries 510-1 through 510-N, wherein N is a positive integer greater than 1. Each of the entries 510 may include the value of an operational parameter of the storage system 120 and a timestamp indicating the time when the value was measured. For instance, entry 510-1 may identify the value of an operational parameter (e.g., CPU utilization, etc.) at time TS_1, entry 510-2, entry 510-2 may identify the value of the same operational parameter at time TS_2, and entry 510-N may identify the value of the operational parameter that is measured at time TS_N. Although, in the present example, each of the performance counters is provided with a separate data structure where collected values are stored, it will be understood that alternative implementations are possible in which the performance counters 122 write the data they collect to a shared database.

In some implementations, the operational parameter whose values are collected by the logic 124 may include a utilization rate of a particular hardware component (or components) of the storage system 120, such as a CPU utilization rate, a RAM utilization rate, an amount of network bandwidth used by the storage system 120, etc., Additionally or alternatively, in some implementations, the operational parameter whose values are collected by the logic 124 may include any measure of the efficiency and/or speed at which the storage system 120 performs a particular operation, such as speed and/or efficiency at which the storage system 120 performs data compression, speed and/or efficiency at which the storage system 120 performs RAID defragmentation, speed and/or efficiency at which the storage system generates volume snapshots, speed or efficiency at which the storage system 120 executes write requests, etc.

By way of example, one of the performance counters 122 may be configured to record the CPU utilization rate of the storage system 120. As another example, one of the performance counters 122 may be configured to record the memory utilization rate of the storage system 120. As yet another example, one of the performance counters 122 may be configured to record how much storage space is saved by using a first snapshot generation algorithm (in comparison to when a second snapshot generation algorithm is used). As yet another example, one of the performance counters 122 may be configured to record the latency at which a particular operation is performed by the storage system 120 (e.g., a read operation, a write operation, a defragmentation operation, etc.).

The test manager 110 may use one or more of the performance counters 122 to adaptively adjust the execution of any of the tests 112. For example, when the test manager 110 begins the execution of a particular test 112, the test manager 110 may also begin executing one or more performance counters 122. The performance counters may be executed concurrently with the test 112. At predetermined time intervals (e.g., every 5 minutes) during the execution of the particular test 112 the test manager 110 may retrieve data collected by any of the performance counters 122, analyze the retrieved data, and reconfigure the particular test 112. In some respects, adaptively adjusting the execution of any of the tests 112 may increase the speed at which software bugs are uncovered by the test. Furthermore, according to the present disclosure, it has been observed that adaptively adjusting the execution of any of the tests 112 may increase machine utilization by 50% and shorten the time needed to reach full coverage by 30%.

Reconfiguring a particular test, for example, may include causing the particular test to exert greater strain on the storage system 120. For instance, reconfiguring the test may include increasing the rate at which I/O requests are provided to the storage system 120 (as part of the test), decreasing the network bandwidth that is available to the storage system 120, etc. As another example, in some implementations, reconfiguring the particular test may include causing the test to exert lesser strain on the storage system 120. For instance, reconfiguring the test may include decreasing the rate at which I/O requests are provided to the storage system 120 (as part of the test), or increasing the network bandwidth that is available to the storage system 120, etc.

FIG. 2 is a schematic diagram of the test manager 110, in accordance with one particular implementation. As illustrated, the test manager 110 may include a processor 210 that is operatively coupled to a memory 220, and communications interface(s) 230. The processor 210 may include one or more of a general-purpose processor (e.g., an x86 processor, an ARM-based processor, a MIPS processor), an application-specific integrated circuit (ASIC), a Field-Programmable Gate Array (FPGA), and/or any other suitable type of processing circuitry. The memory 220 may include any suitable type of volatile and/or non-volatile memory. For example, in some implementations, the memory 220 may include one or more of a random-access memory (RAM), a read-only memory (ROM), a solid-state drive (SSD), electrically erasable programmable read-only memory (EE- PROM), and/or any other suitable type of memory. The communications interface(s) 230 may include one or more of a Bluetooth interface, an InfiniBand interface, an Ethernet interface, a WiFi interface, a ZigBee interface, a Universal Serial Bus (USB) interface, and/or any other suitable type of interface.

The processor 210 may be configured to execute a test execution logic 212. The test execution logic 212 may include one or more processor-executable instructions that are configured to execute tests on the storage system 120. Although, in the present example, the test execution logic 212 is implemented in software, alternative implementations are possible in the test execution logic 212 is implemented in hardware or as a combination of software and hardware. In some implementations, the test execution logic 212 may be configured to execute a process 700, which is discussed further below with respect to FIG. 7.

The memory 220 may be configured to store the tests 112, and the performance counters 122. Furthermore, the memory 220 may be configured to store a counter set descriptor 222, a test set descriptor 224, a test-to-counter map 226, and a reconfiguration database 228. The counter set descriptor 222 may include a data structure that identifies all (or at least some) of the performance counters 122 that are available to the test manager 110. In some implementations, the counter set descriptor 222 may include a plurality of performance counter identifiers, wherein each of the identifiers corresponds to a different one of the performance counters 122. The test set descriptor 224 may include a data structure that identifies all (or at least some) of the tests 112 that are available to the test manager 110. In some implementations, the test set descriptor 224 may include a plurality of identifiers, wherein each of the identifiers corresponds to a different one of the tests 112.

An example of the test-to-counter map 226 is shown in further detail in FIG. 3. As illustrated, the test-to-counter map 226 may include a plurality of entries 310. Each of the entries 310 may include afield 312, afield 314, and a field 316. The field 312 in each of the entries 310 may identify a respective test 112 that is associated with the entry the field 314 in each of the entries 310 may identify one or more of the performance counters 122 that are associated with that entry's 310 respective test, and the field 316 in each of the entries 310 may identify a respective reconfiguration period that is associated with the entry's 310 respective test 112. The reconfiguration period in each of the entries 310 may specify the frequency at which the entry's 310 respective testis going to be reconfigured. As illustrated in FIG. 3, entry 310A indicates that: (i) test #1 is associated with performance counters 1, 3, 5, and (ii) test #1 is to be reconfigured every minute based on data that is collected by performance counters 1, 3, and 5. Entry 3108 indicates that: (i) test #2 is associated with performance counters 2, 6, 7, and (ii) test #2 is to be reconfigured every 10 minutes based on data that is collected by performance counters 2, 6, and 7. Entry 310C indicates that: (i) test #3 is associated with performance counters 1, 4, 6, and (ii) test #3 is to be reconfigured every 20 seconds based on data that is collected by performance counters 1, 4, and 6. Entry 310D indicates that: (i) test #4 is associated with performance counters 1, 2, 5, and (ii) test #4 is to be reconfigured every 30 minutes based on data that is collected by performance counters 1, 2, and 5.

An example of the reconfiguration database 228 is shown in further detail in FIG. 4. As illustrated, the reconfiguration database 228 may include a plurality of entries 410. Each of the entries 410 may include a respective field 412 and a respective field 414. The respective field 412 in each of the entries 410 may include an identifier corresponding to a test that is associated with the entry. The respective field 414 in each of the entries 410 may include an identifier corresponding to a setting map that is associated with that entry's respective test. According to the example of FIG. 4, entry 410A indicates that test #1 is associated with a first setting map, entry 410B indicates that test #2 is associated with a second setting map, entry 410 (indicates that test #3 is associated with a third setting map, and entry 410D indicates that test #4 is associated with a fourth setting map.

An example of a setting map 500 is shown in further detail in FIG. 5. The setting map 500 is associated with test #1 in the present example. However, it will be understood that the setting map 500 may be associated with any other one of the tests 112. As illustrated, the setting map 500 may include entries 510-1 through 510-M, where M is a positive integer greater than 1. Each of the entries 510 may include a field 512 and a respective field 514. The field 512 in each of the entries 510 may identify a respective execution signature associated with test #1 (i.e., the setting map's 500 corresponding test). The field 514 in each of the entries 510 may identify a configuration setting for test #1 that is associated with the entry's 510 respective signature. According to the example of FIG. 5, entry 510-1 provides that when a first execution signature is calculated for test #1, test #1 should begin executing in accordance with a first configuration setting value. Entry 510-2 provides that when a second execution signature is calculated for test #1, test #1 should begin executing in accordance with a second configuration setting value. And entry 510-M provides that when an M-th execution signature is detected, test #1 should begin executing in accordance with an M-th configuration setting value.

The phrase "execution signature for a test" may refer to any scalar or vector value that is calculated based on the values of operational parameters of the storage system 120 that are collected by counters associated with the test. For instance, as illustrated in FIG. 3, an execution signature for test #1 may include any scalar or vector that is calculated based on values of operational parameters that are collected by each or at least some) of performance counters 1, 3, and 5. An execution signature for test #2 may include any scalar or vector that is calculated based on values of operational parameters that are collected by each or at least some) of performance counters 2, 6, and 7. An execution signature for test #3 may include any scalar or vector that is calculated based on values of operational parameters that are collected by each or at least some) of performance counters 1, 4, and 6. And an execution signature for test #4 may include any scalar or vector that is calculated based on values of operational parameters that are collected by each or at least some) of performance counters 1, 2, and 5.

By way of example, test #1 may include transmitting to the storage system 120 read requests and measuring the latency of the read request. Similarly, the configuration setting whose values are specified by the setting map 500 may be the rate at which I/O requests are issued to the storage system. Thus, according to this example, entry 510-1 may specify that when the first execution signature is calculated for test #1, the test manager 110 should begin transmitting read requests to the storage system 120 at the rate of 5 requests/ms. Entry 510-2 may specify that when the first execution signature is calculated for test #1, the test manager 110 should begin transmitting read requests to the storage system 120 at the rate of 7 requests/ms. And entry 510-M may specify that when the first execution signature is calculated for test #M, the test manager 110 should begin transmitting read requests to the storage system 120 at the rate of 75 requests/ms.

Figure 6A:
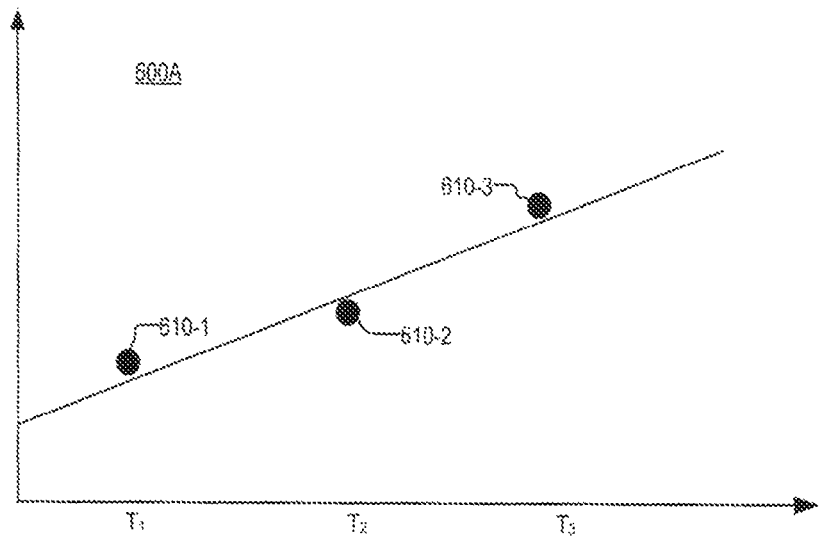
FIG. 6A is a plot illustrating one possible method for calculating execution signatures for a test, according to aspects of the disclosure.

FIG. 6A provides an example of a process for calculating the value of an execution signature for test #1. Shown in FIG. 6A is a curve 60A. According to the example of FIG. 6A, the execution signature for test #1 is the slope of the curve 600A. As illustrated, the curve 600 is the best fit to data points 610-1, 610-2, and 610-3. Data point 610-1 may be generated by normalizing and summing up; (i) a first value of a first operational parameter of the storage system 120 that is obtained from performance counter 1 at time $T_1$, (ii) a first value of a second operational parameter of the storage system 120 that is obtained from performance counter 3 at time $T_1$, and (iii) a first value of a third operational parameter of the storage system 120 that is obtained from performance counter 5 at time $T_1$. Data point 610-2 may be generated by normalizing and summing up: (i) a second value of a first operational parameter of the storage system 120 that is obtained from performance counter 1 at time $T_2$, (ii) a second value of a second operational parameter of the storage system 120 that is obtained from performance counter 3 at time $T_2$, and (iii) a second value of a third operational parameter of the storage system 120 that is obtained from performance counter 5 at time $T_2$. Data point 610-3 may be generating by normalizing and summing up: (i) a third value of a first operational parameter of the storage system 120 that is obtained from performance counter 1 at time $T_3$, (ii) a third value of a second operational parameter of the storage system 120 that is obtained from performance counter 3 at time $T_3$, and (iii) a third value of a third operational parameter of the storage system 120 that is obtained from performance counter 5 at time $T_3$. Although in the example of FIG. 6A the execution signature for test #1 is the slope of the curve 600A, alternative implementations are possible in which the execution signature for test #1 is any other suitable characteristic of the curve 600A.

Figure 6B:
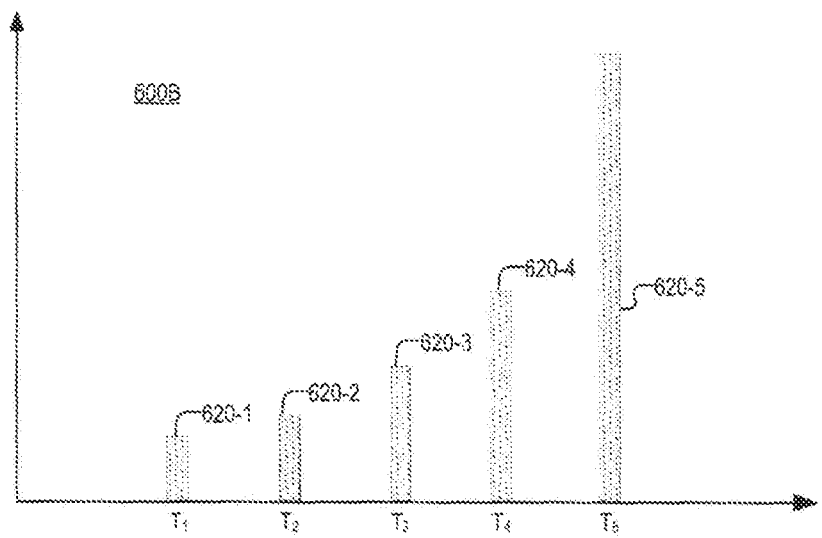
FIG. 6B is a plot illustrating one possible method for calculating execution signatures for a test, according to aspects of the disclosure.

FIG. 6B provides an example of a process for calculating the value of an execution signature for test #2. Shown in FIG. 6B is a bar diagram with the values of data points 620-1 through 620-5. As discussed above, data points 620-1 through 620-5 may be calculated based on the values of performance counter 2, performance counter 6, and performance counter 7. For example, data point 620-1 may be calculated based on the values of performance counters 2, 6, and 7 at time $T_1$; data point 620-2 may be calculated based on the values of performance counters 2, 6, and 7 at time $T_2$ data point 620-3 may be calculated based on the values of performance counters 2, 6, and 7 at time $T_3$; data point 620-4 may be calculated based on the values of performance counters 2, 6, and 7 at time $T_4$; and data point 620-5 may be calculated based on the values of performance counters 2, 6, and 7 at time $T_5$. In the example of FIG. 6B, the relative increase of the values of datapoints 620 is monitored, and test #2 is reconfigured when a continuous increase in the value of the data points 620 has been observed for longer than the duration of a predetermined time period (e.g., 5 sampling cycles etc.). In other words, in the example of FIG. 2, the signature for test #2 is the duration of the period for which the value of data points 620 increases continuously (i.e., without any decreases). According to the example of FIG. 6B, if the value of data points 620 increases continuously for longer than five sampling cycles, test #2 is reconfigured.

FIGS. 6A-B is provided for illustrative purposes only. Those of ordinary skill in the art would readily recognize, after reading the present disclosure, that data obtained from various performance counters can be combined in a variety of ways to generate an execution signature for a particular test. Stated succinctly, it will be understood that the present disclosure is not limited to any specific method for generating execution signatures.

Figure 7:
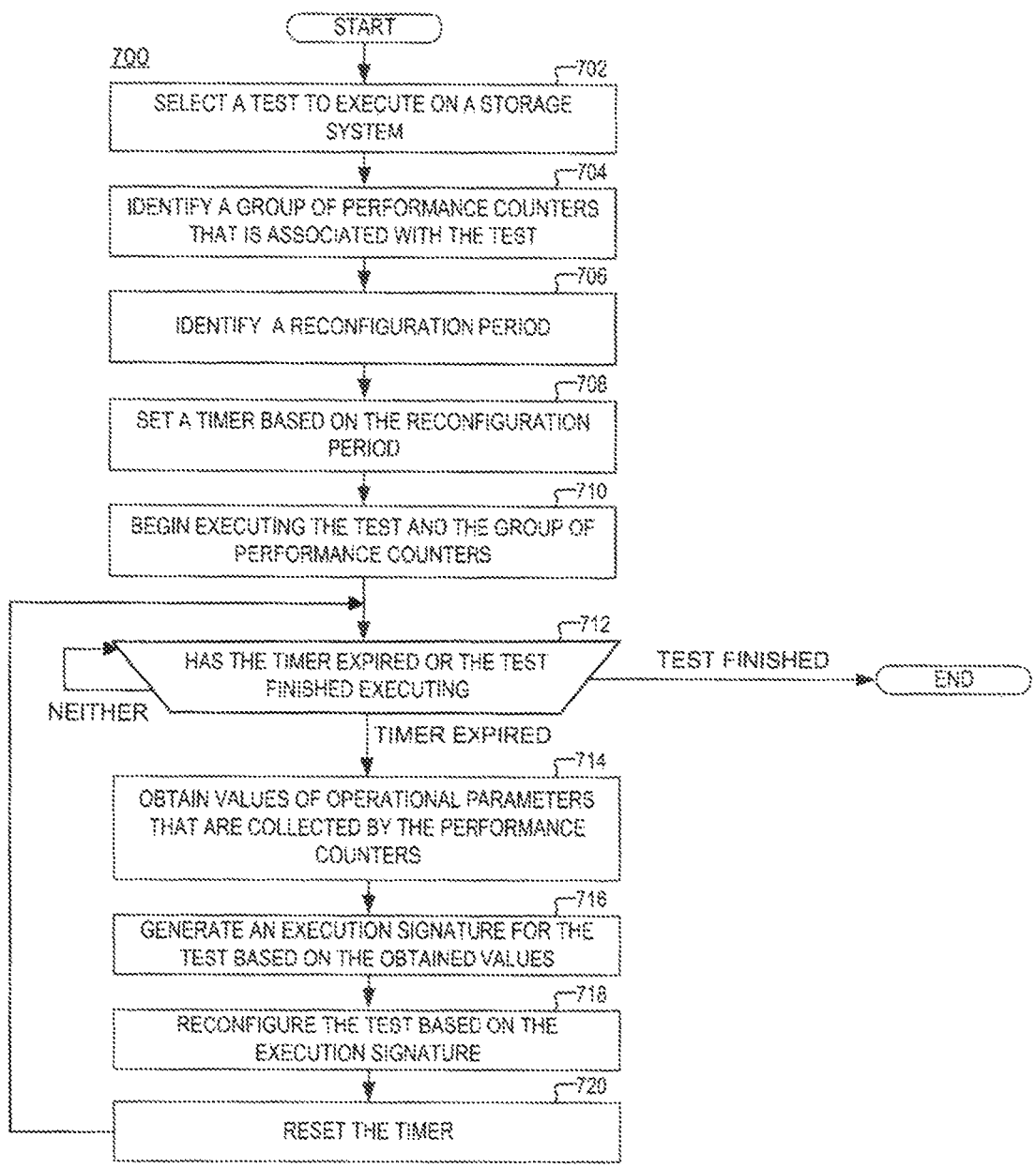
FIG. 7 is a flowchart of an example of a process, according to aspects of the disclosure.

FIG. 7 is a flowchart of an example of a process 700, according to aspects of the disclosure. At step 702, the test manager 110 selects a test to execute on the storage system 120. In some implementations, selecting the test may include retrieving an identifier corresponding to the test from the test set descriptor 224. At step 704, the test manager 110 identifies a group of performance counters that are associated with the test (selected at step 702). In some implementations, the test manager 110 may identify the group of counters by performing a search of the test-to-counter map 226 (based on the retrieved test identifier). At step 706, the test manager 110 identifies a reconfiguration period that is associated with the test (selected at step 702). In some implementations, the test manager may identify the reconfiguration period by performing a search of the test-to-counter map 226 (based on the retrieved test identifier). At step 708, the test manager 110 sets a timer based on the reconfiguration period. In some implementations, setting the timer based on the reconfiguration period may include causing the timer to expire at time intervals that are equal to the duration of the reconfiguration period. At step 710, the test manager 110 begins executing the test (selected at step 702) and the group of performance counters (identified at step 704). The test and the performance counters may be executed concurrently with one another. At step 712, the test manager 110 determines whether the timer has expired or whether the test has finished executing. If the test has finished executing, the process 700 ends. If the timer has expired, but the test is still running, the process 700 proceeds to step 714. Otherwise, if neither the test has finished executing nor the timer has expired, step 712 is executed again. At step 714, the test manager 110 obtains the value of operational parameters that are collected by performance counters from the group (identified at step 704). At step 716, the test manager 110 generates an execution signature for the test (selected at step 702) based on the values of the performance counters. At step 718, the test manager reconfigures the test based on the execution signature for the test. In some implementations, reconfiguring the test may include using the reconfiguration database 228 to identify configuration setting for the test based on the execution signature and applying the configuration setting. As discussed above, applying the configuration setting may result in at least one aspect of the execution of the test being changed. At step 720, the test manager 110 resets the timer.

Figure 8:
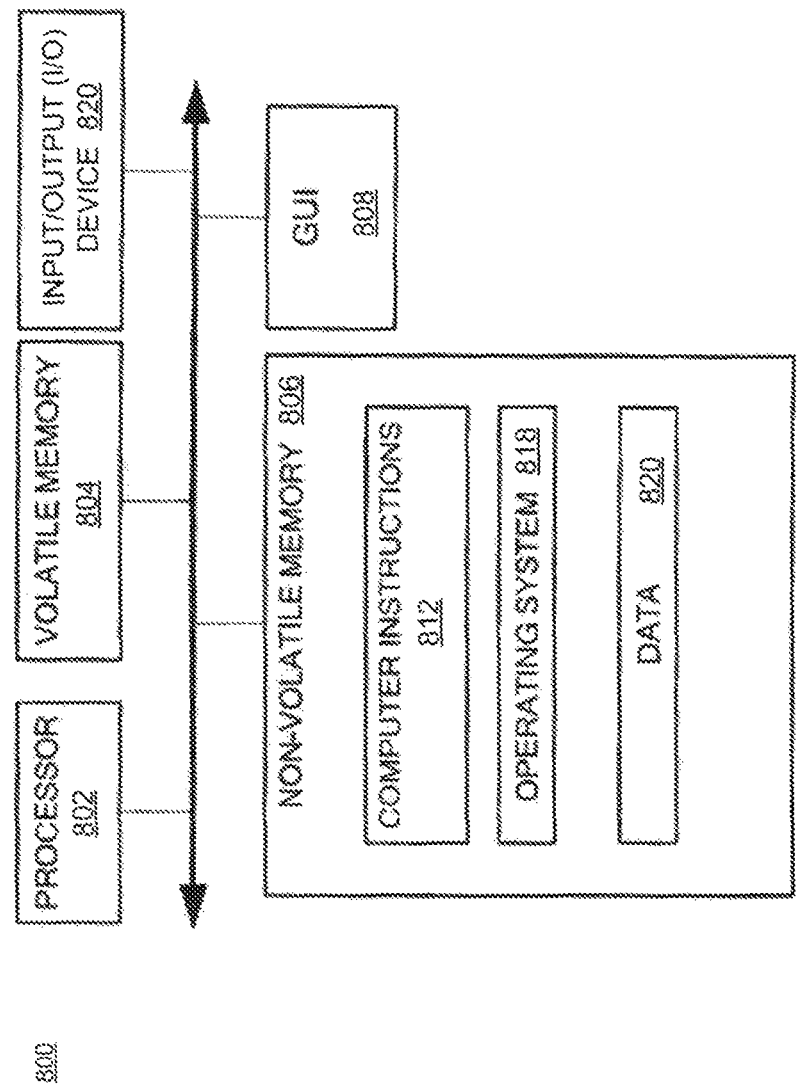
FIG. 8 is a diagram of an example of a computing device, according to aspects of the disclosure.

Referring to FIG. 8, computing device 800 may include processor 802, volatile memory 804 (e.g., RAM), non-volatile memory 806 (e.g., a hard disk drive, a solid-state drive such as a flash drive, a hybrid magnetic and solid-state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 818 and data 820 such that, for example, the computer instructions 812 are executed by the processor 802 out of volatile memory 804. Program code may be applied to data entered using an input device of GUI 808 or received from I/O device 820.

Processor 802 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled." "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
   selecting a test for execution on a computing system;
   identifying a set of performance counters that is associated with the test;
   executing the test and the set of performance counters on the computing system, the test and the set of performance counters being executed concurrently with one another;
   generating an execution signature for the test based on the set of performance counters, the execution signature being generated while the test is being executed on the computing system;
   reconfiguring the test based on the execution signature, the test being reconfigured while the test is being executed on the computing system,
   wherein each of the performance counters in the set is associated with a different respective operational parameter of the computing system;
   wherein each of the performance counters in the set includes logic for collecting values of the performance counter's respective operational parameter.

2. The method of claim 1, wherein the computing system includes a storage system and reconfiguring the test includes increasing a rate at which I/O requests are delivered to the computing system.

3. The method of claim 1, wherein reconfiguring the test includes changing one or more configuration settings of the test to increase a strain that is put on the computing system by the test.

4. The method of claim 1, wherein identifying the performance counters includes retrieving, from a memory, one or more identifiers corresponding to the set of performance counters.

5. The method of claim 1, wherein the execution signature is calculated periodically during an execution of the test.

6. The method of claim 1, wherein the respective operational parameter of at least one of the performance counters in the set includes a measure of efficiency at which the computing system performs an operation that is associated with the test.

7. The method of claim 1, wherein the respective operational parameter of at least one of the performance counters in the set includes a utilization rate of a hardware component of the computing system.

8. An apparatus comprising:
   a memory; and
   at least one processor operatively coupled to the memory, the at least one processor being configured to perform the operations of:
   selecting a test for execution on a computing system;
   identifying a set of performance counters that is associated with the test;
   executing the test and the set of performance counters on the computing system, the test and the set of performance counters being executed concurrently with one another;
   generating an execution signature for the test based on the set of performance counters, the execution signature being generated while the test is being executed on the computing system;
   reconfiguring the test based on the execution signature, the test being reconfigured while the test is being executed on the computing system,
   wherein each of the performance counters in the set is associated with a different respective operational parameter of the computing system;
   wherein each of the performance counters in the set includes logic for collecting values of the performance counter's respective operational parameter.

9. The apparatus of claim 8, wherein the computing system includes a storage system and reconfiguring the test includes increasing a rate at which I/O requests are delivered to the computing system.

10. The apparatus of claim 8, wherein reconfiguring the test includes changing one or more configuration settings of the test to increase a strain that is put on the computing system by the test.

11. The apparatus of claim 8, wherein identifying the performance counters includes retrieving, from a memory, one or more identifiers corresponding to the set of performance counters.

12. The apparatus of claim 8, wherein the execution signature is calculated periodically during an execution of the test.

13. The apparatus of claim 8, wherein the respective operational parameter of at least one of the performance counters in the set includes a measure of efficiency at which the computing system performs an operation that is associated with the test.

14. The apparatus of claim 8, wherein the respective operational parameter of at least one of the performance counters in the set includes a utilization rate of a hardware component of the computing system.

15. A non-transitory computer-readable medium storing one or more processor-executable instructions, which, when executed by at least one processor cause the at least one processor to perform the operations of:
    selecting a test for execution on a computing system;
    identifying a set of performance counters that is associated with the test;
    executing the test and the set of performance counters on the computing system, the test and the set of performance counters being executed concurrently with one another;
    generating an execution signature for the test based on the set of performance counters, the execution signature being generated while the test is being executed on the computing system;
    reconfiguring the test based on the execution signature, the test being reconfigured while the test is being executed on the computing system,
    wherein each of the performance counters in the set is associated with a different respective operational parameter of the computing system;
    wherein each of the performance counters in the set includes logic for collecting values of the performance counter's respective operational parameter.

16. The non-transitory computer-readable-medium of claim 15, wherein the computing system includes a storage system and reconfiguring the test includes increasing a rate at which I/O requests are delivered to the computing system.

17. The non-transitory computer-readable-medium of claim 15, wherein reconfiguring the test includes changing one or more configuration settings of the test to increase a strain that is put on the computing system by the test.

18. The non-transitory computer-readable-medium of claim 15, wherein identifying the performance counters includes retrieving, from a memory, one or more identifiers corresponding to the set of performance counters.

19. The non-transitory computer-readable-medium of claim 15, wherein the execution signature is calculated periodically during an execution of the test.

20. The non-transitory computer-readable-medium of claim 15, wherein the respective operational parameter of at least one of the performance counters in the set includes a measure of efficiency at which the computing system performs an operation that is associated with the test.

* * * * *